United States Patent [19]

Akuta et al.

[11] Patent Number: 4,729,654
[45] Date of Patent: Mar. 8, 1988

[54] LASER INTERFEROMETER

[75] Inventors: Tomohiko Akuta, Nagoya; Masamitsu Naito, Tokyo, both of Japan

[73] Assignee: Nippon Seiko Kabushiki Kaisha, Tokyo, Japan

[21] Appl. No.: 20,024

[22] Filed: Feb. 27, 1987

[30] Foreign Application Priority Data

Feb. 28, 1986 [JP] Japan .................... 61-043288

[51] Int. Cl.⁴ .................................. G01B 9/02
[52] U.S. Cl. ............................ 356/4.5; 356/352; 356/358
[58] Field of Search .............. 356/4.5, 352, 358, 363

[56] References Cited

U.S. PATENT DOCUMENTS 3,395,606 8/1968 Neill ........................ 356/358 X

FOREIGN PATENT DOCUMENTS 921305 3/1985 U.S.S.R. .................... 356/4.5

Primary Examiner—Davis L. Willis
Assistant Examiner—Matthew W. Koren
Attorney, Agent, or Firm—Arnold S. Weintraub

[57] ABSTRACT

A laser interferometer wherein a laser beam emitted from a laser device at a fixed position impinges on an optical lens mounted on a movable member, and interference fringes are produced on a semitransparent mirror formed at an end of the optical lens opposite to the laser device. The interference fringes on the semitransparent mirror are converted to electrical signals by a photoelectric transducer including a bundle of optical fibers arranged along concentric circles and photodiodes located opposed to the end surface of the bundle of optical fibers. Based on the electrical signals from the photoelectric transducer, the number of the interference fringes passing by and the direction of movement of the interference fringes are detected to determine a relative distance between the laser device and the optical lens.

5 Claims, 7 Drawing Figures

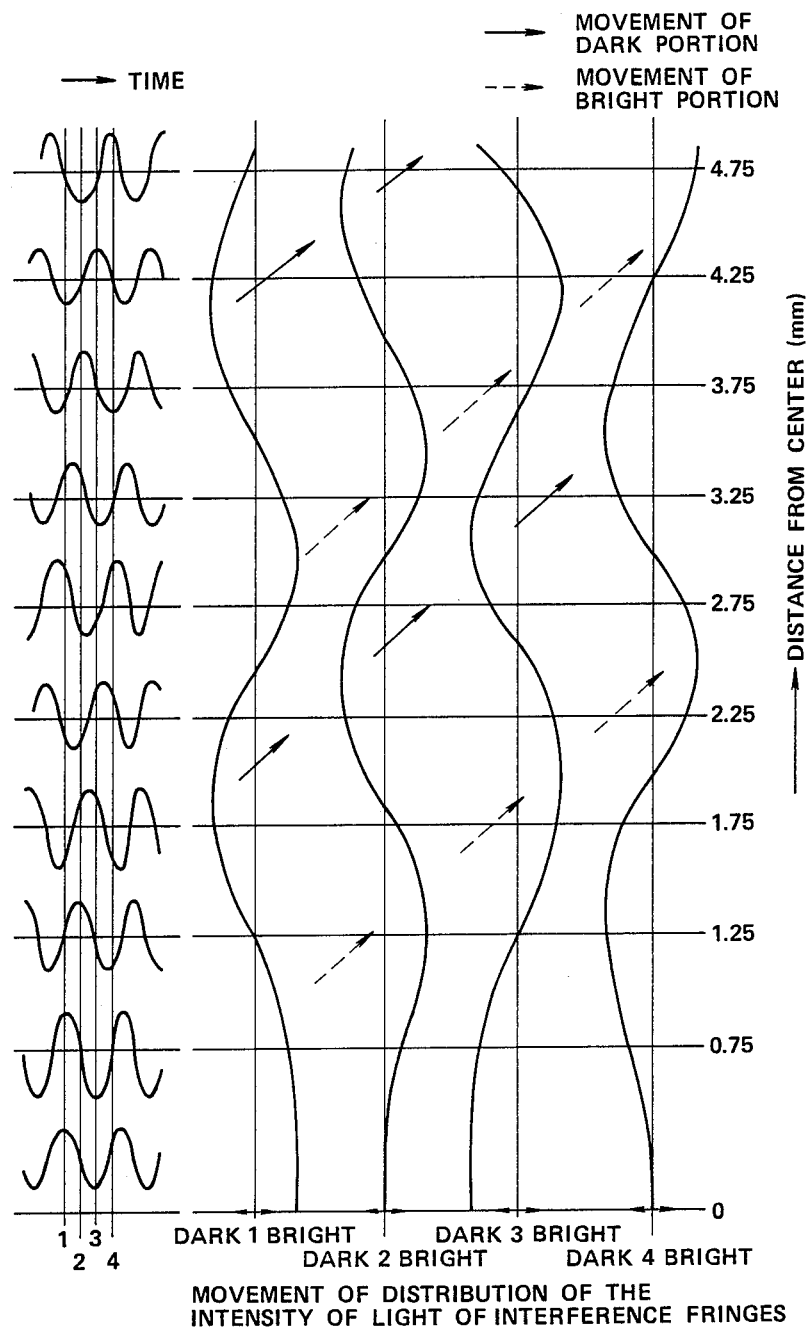

LASER INTERFEROMETER

BACKGROUND OF THE INVENTION

1. Field of the Invention

The present invention relates to a laser interferometer for accurately measuring a distance or length of a moving member, and in particular, to such a laser interferometer which is capable of measuring a distance of or length traveled by a moving member accurately and has a simple structure.

2. Description of the Prior Art

A prior art laser interferometer is described, for example, in a publication "Laser and its Application <additional edition>, published on June 10, 1982, by NIS-SANPO Publishing Co., Ltd., pages 146-149.

In this prior art interferometric measuring machine, the so-called Michelson interferometer is applied to a laser interferometric measuring machine. As shown in FIG. 2.2 in the cited publication, it is composed of a laser device; an inverted telescope system; an interference system having a beam splitter, two fixed mirrors, a photoelectric tube, and a fringe counter; and a movable mirror fixed to a moving member. A beam of light emitted from the laser passes through the inverted telescope and enters the interferometer, and further travels towards the movable mirror through the beam splitter. The light reflected from the movable mirror is further reflected by the fixed mirror disposed in the vicinity of the beam splitter. The reflected light is again reflected by the movable mirror and returns to the beam splitter to enter into the photoelectric tube. In the photoelectric tube, the reflected light joins with another reflected light from the fixed mirror to produce interference. By counting the number of bright bands or fringes by a fringe counter, the length of the moving member is measured.

However, in the aforementioned prior art laser interferometer, a great number of parts are used and the structure is complicated. It is expensive since the precision of the parts used is very high: high skill and technique are required to register the optical axes of the respective parts and to adjust the optical paths. Further the S/N (signal to noise) ratio is small since the interference fringes are detected as a single dimensional signal representing bright and dark and the measuring process of the interference light is complicated.

SUMMARY OF THE INVENTION

The present invention was made in view of the problems in the aforementioned prior art. It is an object of the present invention to provide a laser interferometer which enables the user to measure the length of a moving object with high accuracy, said laser interferometer having a simple design which achieves the alignment of the optical axes, etc., easily, and simplified the measuring process of the interference light.

In order to attain the object, the laser interferometer in accordance with the present invention comprises: a laser device having a semitransparent mirror formed at an end surface thereof which emits a substantially collimated beam of light; an optical leans movably disposed relative to the laser device and having an optical axis aligned with an optical axis of the collimated beam of light of the laser device and having a semitransparent mirror formed at one end on which the beam of light passing through the other end of the optical lens focuses; photoelectric transducer means for converting interference fringes produced at a light outgoing end of the optical lens to an electrical signal; and relative distance detecting means for detecting the number of and direction of movement of the interference fringes passing by based on a detection signal of the photoelectric transducer means, and for detecting the relative distance between the laser device and the optical lens.

In the laser interferometer of the present invention, the substantially collimated beam of light emitted from the laser device having the semitransparent mirror at the emitting end surface thereof enters into the optical lens having the semitransparent mirror formed at the light outgoing end thereof so that the focal point of the incident beam of light is formed at the light outgoing end. A part of the beam of light is reflected from the semitransparent mirror to return to the emitting end of the laser device. The returned beam of light is again reflected from the emitting end of the laser device to enter the optical lens, and this reflected light causes interference with the direct incident light from the laser device, thereby producing interference fringes at the light outgoing end of the optical lens. The interference fringes having bright and dark bands are converted into electrical signals, and the converted signals are supplied to the relative distances detecting means. The direction of movement of the bright and dark bands of the interference fringes and the number of fringes of the interference fringes passing through a predetermined point are measured, and the measurement of a distance of relative movement between the laser device and the optical lens, including a decision as to whether the relative distance is increasing or decreasing, is achieved.

In the present invention, the laser interferometer can provide a highly accurate length measuring function combined with a very simple design composed of: the laser device; the optical lens having the semitransparent mirror at the focal point position of the laser beam emitted from the laser device; the photoelectric transducer means disposed opposing to the light outgoing end of the optical lens; and the relative movement detecting means for detecting the relative movement between the laser device and the optical lens by processing the interference fringe detection signal from the photoelectric transducer means. Since the number of parts used in fabricating the laser interferometer is small, the machine is small in size and light in weight. Further, the adjustment of the parts, including the alignment of the optical axes of the respective parts, is easy. Moreover, further advantages are obtained in that, since the interference fringes are detected as two dimensional information, the S/N ratio can be increased. In addition, since a common path interference is caused in which the direct light and the reflected light pass through the same optical path owing to the optical lens, the influence of external disturbance is small.

BRIEF DESCRIPTION OF THE DRAWINGS

FIGS. 5a and 5b are signal waveform diagrams useful to explain the operation of the present invention.

DESCRIPTION OF THE PREFERRED EMBODIMENTS

An embodiment of the present invention will be described hereinafter with reference to the drawings.

Figure 1:
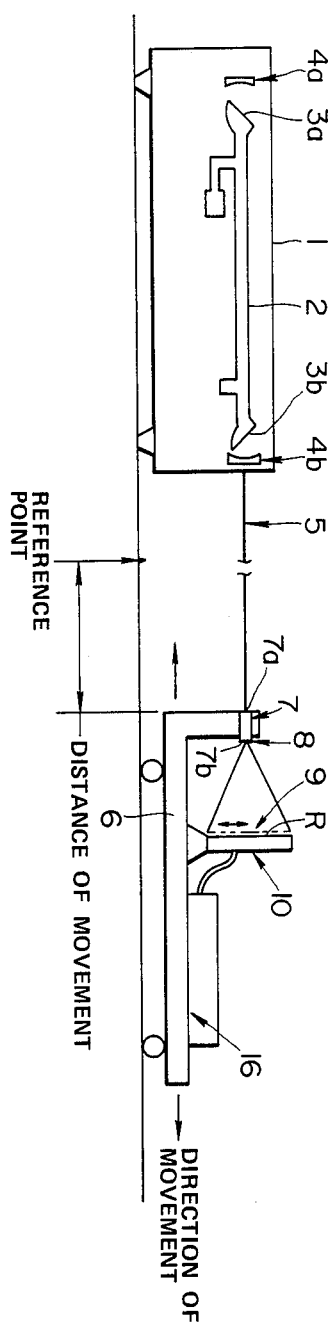
FIG. 1 is a schematic diagram illustrating the structure of an embodiment of the present invention.

FIG. 1 is a schematic diagram showing the arrangement of an embodiment of the present invention. In FIG. 1, reference numeral 1 designates a laser device disposed horizontally on a fixed surface, and may be, for example, a He-Ne laser. This He-Ne laser 1 is of the external-mirror type, and opposed to Brewster windows 3a, 3b of a laser tube 2 thereof, a total reflection mirror 4a and a semitransparent mirror 4b of 90 percent reflectivity, together constituting an optical resonator, are respectively disposed. A collimated beam of light 5 having a single wavelength is emitted from the semitransparent mirror 4b.

Figure 2B:
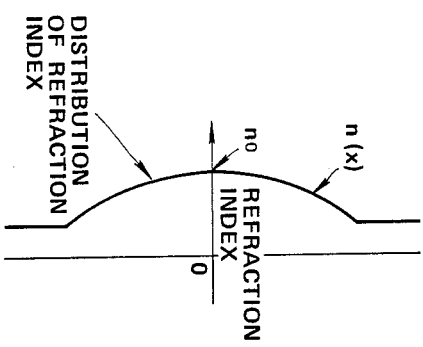
FIGS. 2a and 2b are; respectively, perspective view of a distributed index lens applicable to the present invention and a graph showing a distributed index condition.
Figure 2A:
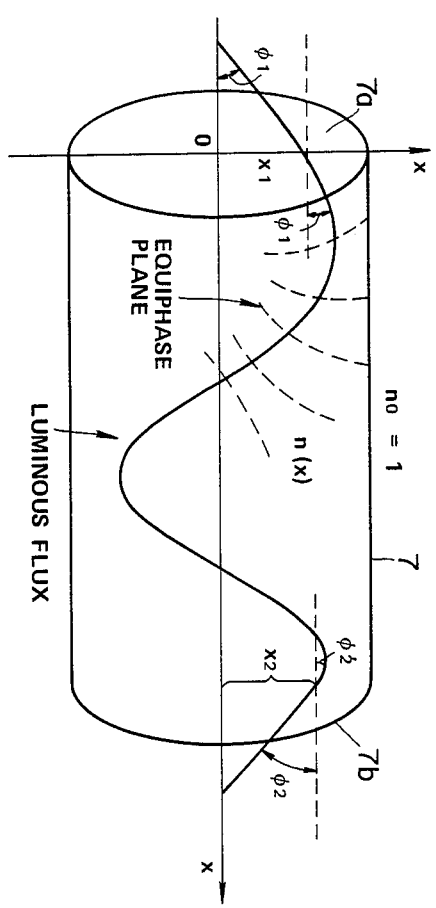

A movable member 6, whose distance from the laser device 1 is to be measured, is movably disposed along the beam of light 5. A distributed index lens 7 is attached to the moving member 6 such that the optical axis of the movable member 6 is substantially aligned with the optical axis of the beam of light 5. The refractive index of the distributed index lens 7 has a value which decreases as the distance from the center axis thereof increases, as shown in FIGS. 2a and 2b. The lens 7 is formed by diffusion of ions into an optical glass rod. The refractive index can be expressed by the following formula in which the X-axis is taken in a radial direction of the lens, and the refractive index distribution constant is represented by A:

$$n(x) = no(1 - \tfrac{1}{2}Ax^2) \qquad \ldots (1)$$

A semitransparent mirror 8 formed, for example, by vapor deposition of gold, is disposed at a light outgoing end 7b of the distributed index lens 7, which end 7b is at the opposite side of distributed index lens 7 from a light incoming end 7a facing the laser device 1. Here, the width of the distributed index lens 7 is selected so that the focal point of the laser beam 5 incident on the light incoming end 7a thereof is formed on the light outgoing end 7b.

Figure 3:
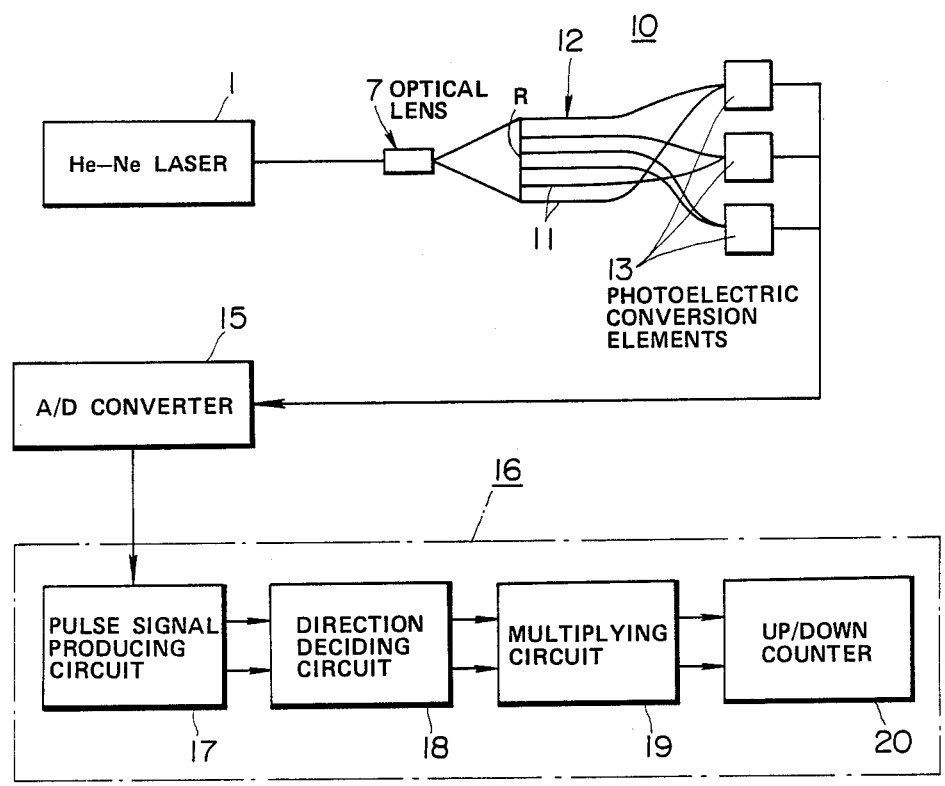
FIG. 3 is a block diagram showing an example of a processing unit applicable to the present invention.

Photoelectric transducer means 10 is mounted on the moving member 6 at a position opposed to the semitransparent mirror 8 of the distributed index lens 7. The photoelectric transducer means 10 includes, for example, as shown in FIG. 3: a bundle of fibers 12, formed by bundling many optical fibers 11 in concentric circles so that a light receiving surface R orthogonal to the optical axis of the distributed index lens 7 is formed at one end; and a plurality of photoelectric conversion elements 13, such as photodiodes or the like. Respective parts of the optical fibers 11 aligned along the concentric circles are bundled onto a plurality of bundles, each of the bundles including the optical fibers aligned along one concentric circle and opposed to a corresponding one of the photoelectric conversion elements 13. These photoelectric conversion elements 13 convert plane signals of the concentric circle shape of the light beam 5 impinging on the light receiving surface R to point signals, and output these signals as interference fringe detection signals.

The interference fringe detection signals outputted from the photoelectric transducer means 10 are supplied to a processing unit 16 through an A/D converter 15. In the processing unit 16, the detection signals of the photoelectric conversion elements 13 are supplied to a pulse signal producing circuit 17. The detection signals are converted to pulse signals by scanning the detection signals at a predetermined period in the pulse signal producing circuit 17. Pulse signals included in two periods and having a phase difference ($\tfrac{1}{4}$ pitch) of 90° are supplied to a direction deciding circuit 18 to produce an addition pulse signal or a subtraction pulse signal depending on a direction of movement of the interference fringes.

The addition or subtraction pulse signal is multiplied by 4 (four) in a multiplying circuit 19, and then supplied to an up/down counter 20. As a result, a relative distance between the laser device 1 and the moving member 6 can be detected in accordance with the counted value of the counter 20.

Figure 4:
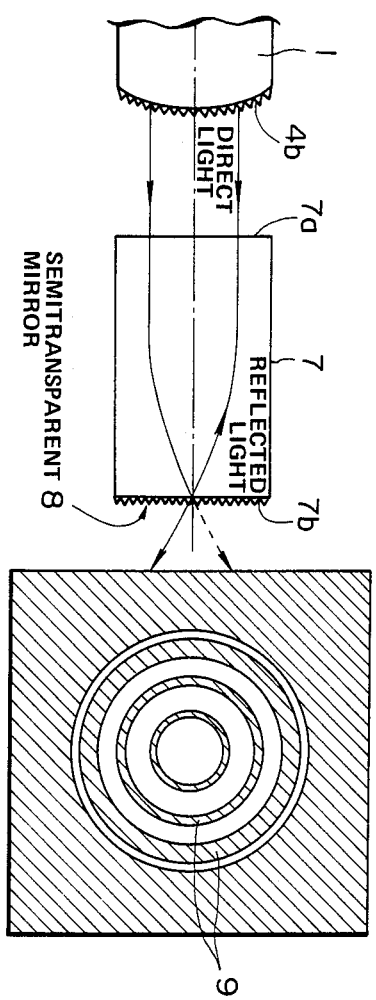
FIG. 4 is a schematic diagram useful to explain the operation of the present invention.

Next, the operation of the aforementioned embodiment will be described. Suppose that the laser beam 5 outputted from the laser device 1 impinge on the light incoming end 7a of the distributed index lens 7 mounted on the movable member 6. The incident laser beam 5 impinging on the distributed index lens 7 converges at a point on the light outgoing end 7b, as shown in FIG. 4. About 50 percent of the laser beam 5 is reflected from the semitransparent mirror 8 to return to the laser device 1. About 99 percent of the returned laser beam is reflected from the emitting end surface of the laser device 1 and enters again into the distributed index lens 7. As a result, an optical path difference of two times the optical path from the emitting end of the laser device 1 to the semitransparent mirror 8 of the distributed index lens 7 is created between the optical path of the direct light 5 impinging directly on the distributed index lens 7 from the laser device 1 and the reflected light of the direct light 5. Thus, both the direct light 5 and the reflected light interfere with each other. Due to this interference, clear interference fringes 9 of concentric circles are produced at the light outgoing side of the distributed index lens 7 as shown in FIG. 4 (in FIG. 4, dark portions are shown with hatching). It is thought that the reason for the generation of interference fringes in the shape of concentric circles 9 as mentioned above is that the light reflected from the semitransparent mirror 4b becomes a spherical wave due to the face that the outer end surface of the semitransparent mirror 4b, which serves as the emitting end of the laser device 1, is of a somewhat spherical shape.

The interference fringes 9 are projected on the light receiving surface R of the photoelectric transducer means 10, and this interference pattern is transmitted to the plurality of photoelectric conversion elements 13 as point information through the bundle of fibers 12. the interference fringe detection signals representing, respectively, bright and dark conditions of respective points on the light receiving surface R in the radial direction, as shown in FIG. 5(a), are supplied to the processing unit 16 through the A/D converter 15.

Thus, in the pulse signal producing circuit 17 in the processing unit 16, by scanning the interference fringe detection signals at a predetermined period, waveform signals representing the distribution of the intensity of light in the radial direction of the light receiving surface R, as shown in FIG. 5(b), are obtained. The waveform signals for two periods having a phase difference of 90° from each other are then supplied to the direction deciding circuit 18 to determine the direction of movement of the interference fringes 9. In this case, when the interference fringes 9 move outwardly from the center position of the light receiving surface R as shown in FIG. 5(a), a subtraction pulse signal is outputted in accordance with the movement of the interference fringes 9 and it is determined that the distance between the laser device 1 and the movable member 6 is decreasing. Conversely, when the interference fringes 9 move towards the center position from the peripheral portion of the light receiving surface R, it is determined that the distance between the laser device 1 and the movable member 6 is increasing, and an addition pulse signal corresponding to the movement of the interference fringes 9 is outputted. Further, when the interference fringes 9 do not move, and the waveform signals do not change, it is determined that the distance of movement between the laser device 1 and the movable member 6 is not changed, and neither a subtraction pulse signal nor an addition pulse signal is outputted.

The subtraction pulse signal or the addition pulse signal outputted from the direction deciding circuit 18 is supplied to the multiplying circuit 19 to multiply the supplied signal by 4 (four), and the multiplied signal is delivered to the up/down counter 20. The count value of the up/down counter 20 corresponds to the relative distance between the laser device 1 and the movable member 6. A digital display (not shown) may also display the count value on a suitable display unit.

The bright and dark portions of the interference fringes 9 are inverted each time the distance between the laser device 1 and the movable member 6 is changed by $\frac{1}{2}$ of the wavelength of the light beam. For the He-Ne laser, for example, having a wavelength of 0.6328 $\mu$m, the change in the distance is 0.3164 $\mu$m. Accordingly, by multiplying this change in distance by 4 (four) in the multiplying circuit 17, it is possible to obtain resolution on the order of a $\frac{1}{8}$ wavelength, that is 0.0791 $\mu$m for the He-Ne laser, for example.

In the aforementioned embodiment, by employing the distributed index lens 7 as an optical lens, even when a certain positional deviation or an angular deviation between the optical axis of the laser beam 5 emitted from the laser device 1 and the center axis of the lens 7 occurs, since the distributed index lens 7 has a converging property, the generation of the interference fringes is not affected very much. There is not need to mount the distributed index lens 7 with such high accuracy, as required by the prior art. Further, in the case in the aforementioned embodiment, the photoelectric transducer means 10 includes bundle of fibers 12, including optical fibers 11 arranged along the concentric circles, and the photoelectric conversion elements 13. the other ends of the optical fibers 11 arranged along respective concentric circles are bundled into a plurality of bundles so that these bundles respectively oppose the photoelectric conversion elements 13. As a result, the plane information of the interference fringes 9 produced on the light receiving surface R can be converted to point information extending radially from the center position. Accordingly, there are advantages in that measurement processing can be easily performed in the processing unit 16, and, also, the alignment of the optical axis of the laser beam with the optical axis of the distributed index lens 7 can be easily performed. In other words, a line of optical fibers in a diametrical direction of the light receiving surface R and another orthogonal line of optical fibers are connected to one of the photoelectric conversion elements 13, and the distribution of the intensity of light is measured for each pair of lines of the optical fibers. The alignment of the optical axes can be easily performed by setting and adjusting the distributed index lens 7 so that the distribution of the intensity of light is symmetrical with respect to the center. Thus, the alignment of the optical axes is much simpler as compared with prior art laser interferometers.

In the embodiment mentioned above, the laser device 1 is disposed on a fixed surface, and the distribution index lens 7, photoelectric transducer means 10, and processing unit 16 are mounted on the movable member 6. However, the present invention is not limited to this, and the moving and fixed positioning relationships may be reversed. Alternatively, the laser device 1 may also be mounted on another moving member, so that a relative movement distance between both the moving members can be measured.

Further, in the embodiment described above, although the distributed index lens 7 is used as an optical lens, the present invention is not limited to this. A combination of two ball lenses may be used such that a laser beam incident on one of the two ball lenses is converted on the light outgoing end of the other ball lens to form a semitransparent mirror on the light outgoing end thereof. Also, an end-focusing type lens such as a drum-shaped lens or an aspherical lens may be used so that a semitransparent mirror is formed at the light outgoing end of the lens. In short, the only requirement is that the focal point of the laser beam falls on the light outgoing end of the lens.

Moreover, in the embodiment described above, the emitting end surface of the laser device 1 is formed slightly spherical so that the interference fringes 9 of the concentric circle shape are produced. However, the present invention is not limited to the above case and is naturally applicable to cases wherein interference fringes to longitudinal bands or traverse bands are produced.

Further, the photoelectric transducer means 10 is not limited to the use of the bundle of fibers 12 and the photoelectric conversion elements 13. A photocell, an image sensor or the like may be used. In particular, use of an image sensor is advantageous since it is possible thereby to detect a zig-zag movement or the degree of inclination of the moving member by performing the pattern recognition with respect to the output.

Further, as the laser device 1, the present invention is not limited to the use of the He-Ne laser, and other gas lasers, solid-state lasers, and semi-conductor lasers may be used if the frequency stability is maintained, or if compensation for frequency variations is provided in the case where the frequency stability is poor. In particular, if a semiconductor laser is used, the whole structure may be made small in size.

Still further, in the embodiment described in the foregoing, although the electronic circuit is used as a processing unit, the present invention is not limited to this, and a microcomputer is also applicable.

We claim:
1. A laser interferometer comprising:
  a laser device having a first semitransparent mirror formed at an emitting end which emits a substantially collimated beam of light;
  an optical lens having an incident side and an emitting side and disposed movably relative to said laser device, said optical lens having an optical axis aligned with an optical axis of the collimated beam of light emitted form said laser device and a second semitransparent mirror formed at the emitting side thereof on which a beam of light passing through the incident side forms a focal point;

photoelectric transducer means for converting interference fringes produced at the emitting side of said optical lens to an electrical signal; and relative distance detecting means for detecting the number of the interference fringes passing through a predetermined point and the direction of movement of the interference fringes based on a detection signal of said photoelectric transducer means and for detecting the relative distance between said laser device and said optical lens.

2. The laser interferometer of claim 1 wherein said optical lens is a distributed index lens.

3. The laser interferometer of claim 2 wherein the collimated beam of light emitted from the laser device is a spherical wave and causes interference fringes in the form of concentric circles to be produced at the emitting side of the optical lens.

4. The laser interferometer of claim 3 wherein the photoelectric transducer means comprises:

a plurality of optical fibers each having first and second ends, the first ends of the plurality of fibers being arrayed in a pattern of concentric circles corresponding to the interference fringes, the fibers of each concentric circle being bundled into a separate bundle, and the second ends of the fibers in each bundle being arrayed opposed to a photoelectric transducer means to form means for converting plane signals of the concentrical circle shape of the interference fringes to point signals and outputting the converted signals as interference detection signals.

5. The laser interferometer of claim 1 wherein a part of the beam of light focused on the second semitransparent mirror is reflected back to the emitting end of the laser device and is subsequently again reflected from the first semitransparent mirror to enter the optical lens, thereby creating interference fringes with the unreflected collimated beam of light emitted directly from the laser device.

* * * * *